United States Patent [19]

Hingorani

[11] 4,355,241
[45] Oct. 19, 1982

[54] MEANS FOR DAMPING SUBSYNCHRONOUS OSCILLATIONS IN AN AC POWER SYSTEM INCLUDING OVERLOAD PROTECTION

[75] Inventor: Narain G. Hingorani, Los Altos Hills, Calif.

[73] Assignee: Electric Power Research Institute, Inc., Palo Alto, Calif.

[21] Appl. No.: 178,622

[22] Filed: Aug. 15, 1980

[51] Int. Cl.³ .......................... H02J 3/18; G05F 1/12
[52] U.S. Cl. .................................. 307/102; 307/105; 323/217
[58] Field of Search ................ 307/102, 105; 323/218, 323/217, 209, 210, 901, 908

[56] References Cited

U.S. PATENT DOCUMENTS

| | | | |
|---|---|---|---|
| 3,551,799 | 3/1969 | Koppelmann | 323/210 |
| 3,731,183 | 5/1973 | Johnson et al. | 323/210 X |
| 3,748,572 | 7/1973 | Kim et al. | 323/218 |
| 3,942,100 | 3/1976 | Käuferle et al. | 323/210 |

*Primary Examiner*—G. Z. Rubinson
*Assistant Examiner*—James L. Dwyer
*Attorney, Agent, or Firm*—Flehr, Hohbach, Test, Albritton & Herbert

[57] ABSTRACT

Reactance means serially connected in a power line is shunted by selectively bidirectional conduction means which is triggered in response to half-cycle time periods of current waves exceeding a desired half-cycle time period and also in response to an over voltage across the reactance means.

6 Claims, 6 Drawing Figures

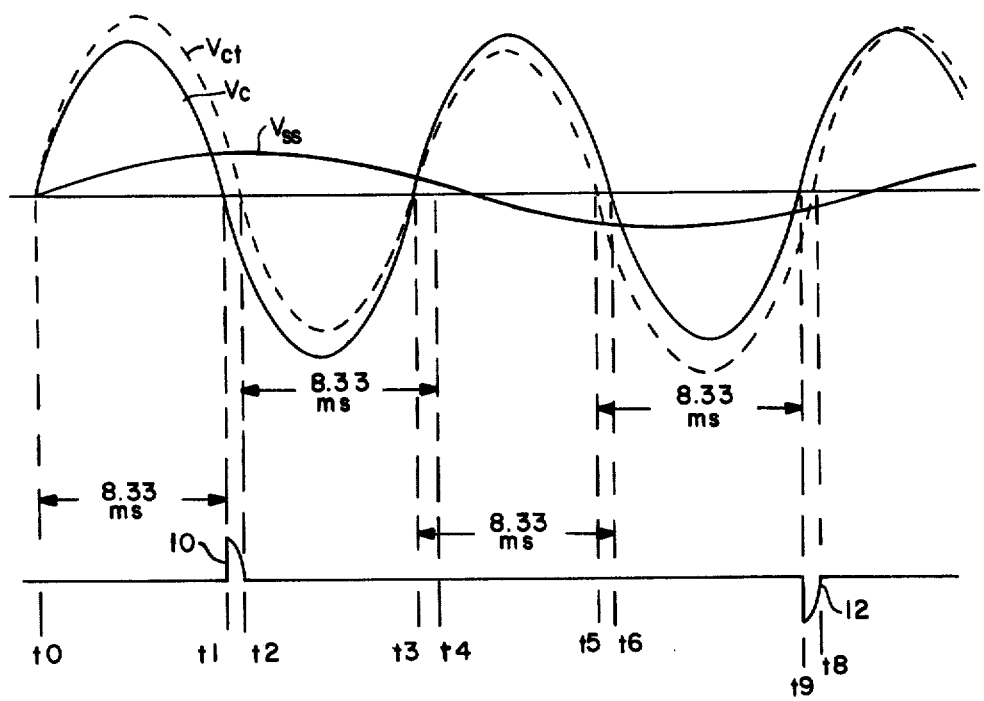
FIG.—1
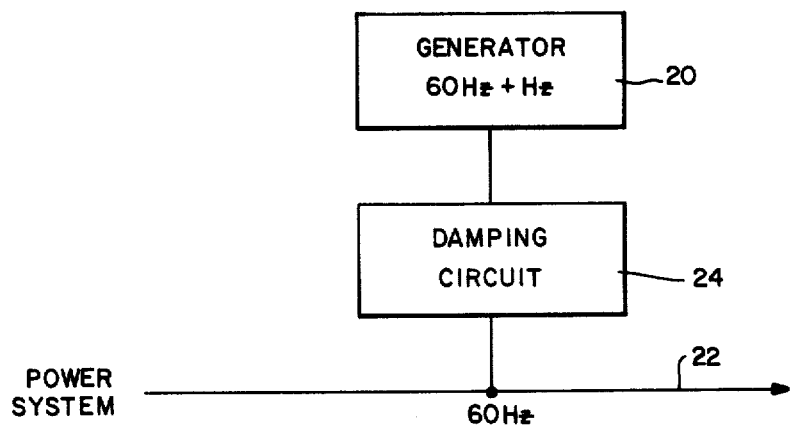
FIG.—2

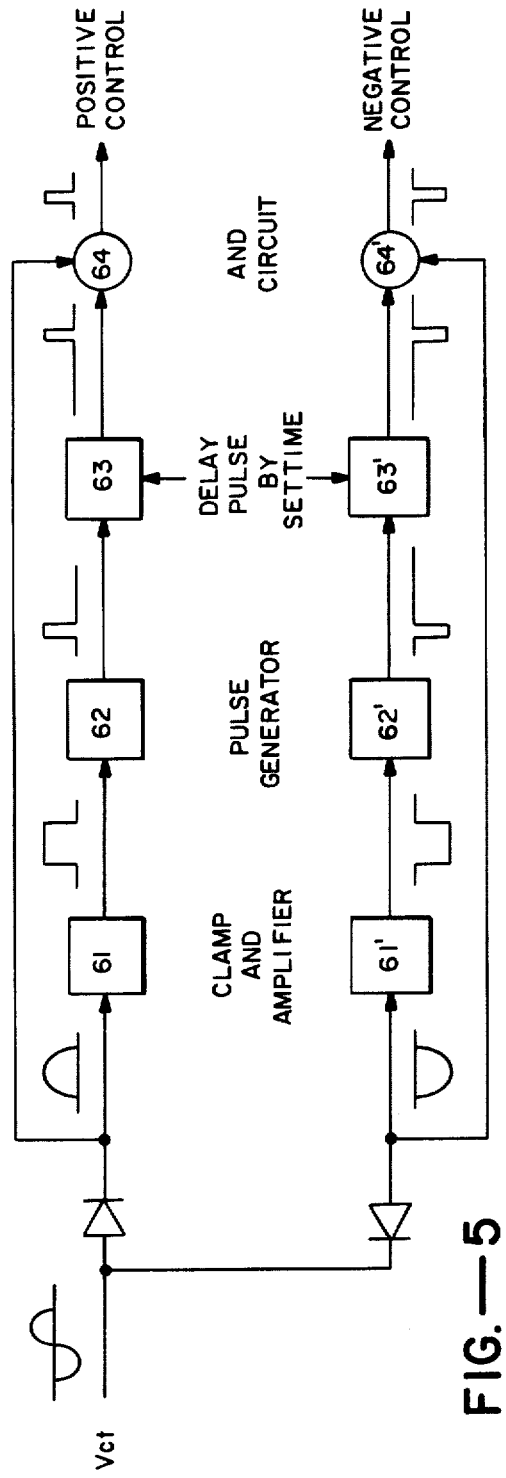
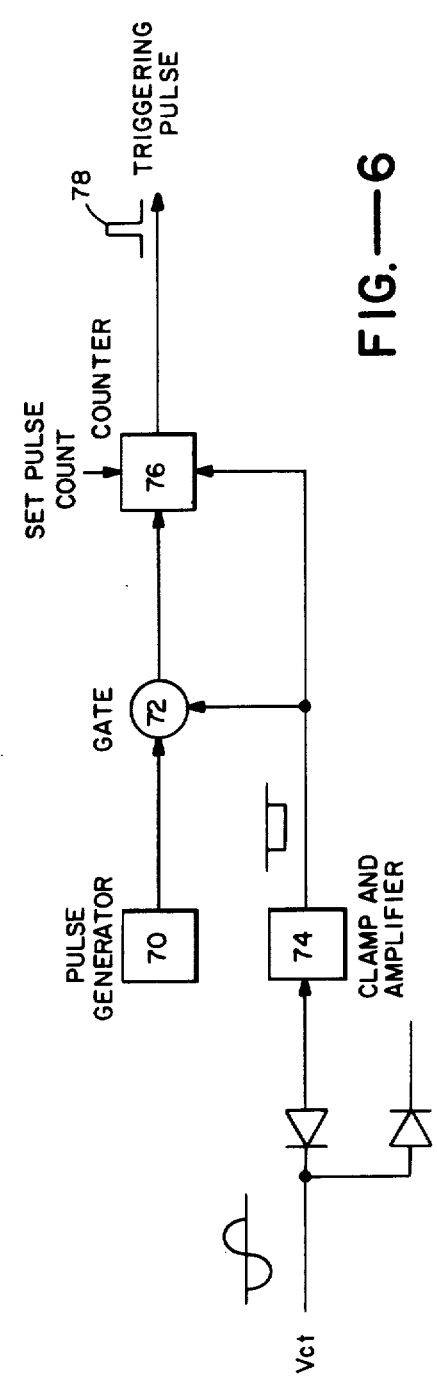
FIG.—5
FIG.—6

MEANS FOR DAMPING SUBSYNCHRONOUS OSCILLATIONS IN AN AC POWER SYSTEM INCLUDING OVERLOAD PROTECTION

This invention relates generally to electric power systems, and more particularly the invention relates to methods and means for eliminating voltage and current subsynchronous oscillations and DC offset in AC power systems.

Alternating current (AC) electric power systems are normally operated at 50 Hz or 60 Hz. Since a plurality of power sources can be connected to a power system, and further since independent power systems are normally interconnected with one another for backup power sharing purposes, the maintenance of an exact frequency for the current voltage in the power system is imperative. Voltage and current oscillations at other frequencies can create serious problems of stability of the system and safety of equipment in the system. These oscillations can be started by small or large disturbances and become a problem when system damping is low or even regenerative at certain frequencies.

For example, when generators are connected to a power system or when two power systems are connected by transmission lines, oscillations in the frequency range of 0.1 Hz to 5 Hz may be present. Such oscillations cause system instability.

Further, when turbine-generator units are connected to a power system through long series compensated transmission lines, oscillations in the range of 10–50 Hz often occur due to interaction and mechanical oscillations of the turbine-generator shaft and the electrical system. Such oscillations can damage the generator shaft even when the amplitude thereof is small.

Disclosed in applicant's copending application Ser. No. 059,994, filed July 23, 1979, now U.S. Pat. No. 4,292,545 is a method and means for damping subsynchronous oscillations and AC power systems. In one embodiment, reactance means is provided in a transmission line to compensate for line inductance, and a current dissipation circuit means is connected in parallel with the reactance for dissipating excess current resulting from subsynchronous oscillations.

In accordance with the present invention, the reactance means serially connected in the power transmission line is tuned to reduce voltage resulting from a subsynchronous oscillation. Further, a current dissipation circuit means is connected with the reactance means to provide voltage overload protection for the reactance means.

Thus, an object of the present invention is improved apparatus for damping subsynchronous oscillations in an AC electrical power system.

Another object of the invention is overload protection means for use with subsynchronous oscillation damping means.

A feature of the invention is the use of tuned circuits serially connected in a power transmission line with the circuits tuned to specific subsynchronous oscillation frequencies in the system.

Another feature of the invention is bi-directional conduction means connected in parallel with reactance means and which is triggered in response to an overload voltage across the reactance means.

These and other objects and features of the invention will be more readily apparent from the following detailed description and dependent claims when taken with the drawing, in which:

FIG. 1 is a representation of voltage on a power transmission line including a desired voltage frequency and a subsynchronous oscillation.

FIG. 2 is a functional block diagram of an electrical power system including damping apparatus.

FIG. 5 is a block diagram of a trigger circuit for use with damping apparatus in accordance with the invention.

FIG. 6 is a block diagram of an alternate trigger circuit for use with damping apparatus in accordance with the invention.

Figure 3:
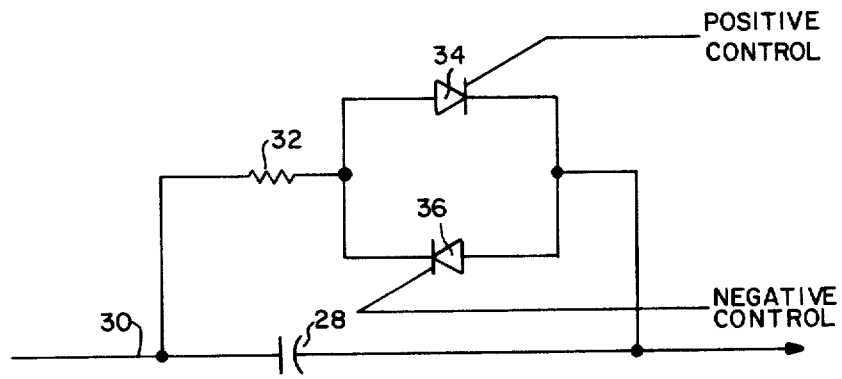
FIG. 3 is an electrical schematic of one embodiment of the damping apparatus illustrated in functional block diagram of FIG. 2.

Referring now to the drawings, FIG. 1 is a representation of the composite voltage, $V_{ct}$, in a power system transmission line including a desired 60 Hz component, $V_c$, and subsynchronous voltage component, $V_{ss}$. In this embodiment it is assumed that the subsynchronous component is at 27 Hz. However, as above indicated, the subsynchronous component may be from less than 1 Hz to as much as 50 Hz due to oscillations and perturbations within the system. Similarly, a dc voltage offset on the transmission line can be dampened in accordance with the invention. The waveforms in FIG. 1 may represent the voltage across a capacitor serially installed in a transmission line to compensate for line inductance.

In accordance with the invention disclosed in copending application Ser. No. 059,994, filed July 23, 1979, the zero voltage crossing point for the curve $V_{ct}$ is detected and the succeeding half cycle period of the line wave is measured and compared with the desired half cycle time period. For a desired 60 Hz wave, the half-cycle time period is 8.33 milliseconds, as illustrated, For a measured half-cycle time period greater than the desired half-cycle time period the composite voltage $V_{ct}$ is dissipated for the portion of the measured half-cycle time period which exceeds the desired half-cycle time period. The measured half cycle may be either a positive voltage or a negative voltage. Thus, means must be provided to dissipate either the excess positive voltage or the excess negative voltage of a measured half-cycle.

In FIG. 1, the first detected line wave polarity transition occurs at time $t_0$. After the desired half time period interval of 8.33 milliseconds, the line wave polarity is detected and indicates that the line wave half-cycle exceeds the desired half cycle as the line wave polarity has not changed during the measured 8.33 milliseconds. The excess line wave voltage which is to be dissipated is indicated by the curve 10 between the end of the first 8.33 millisecond time period, $t_1$, and the time $t_2$ when the line voltage again is at zero.

At time $t_2$ to a second 8.33 millisecond time period is counted to the time $t_4$, and the polarity of the line wave is again detected. In this instance the polarity of the line wave has changed from negative to positive during the measured time period thus indicating that the period of this half-cycle of the line wave is less than a desired half-cycle time period. Accordingly, no dissipation of the line wave occurs.

At the zero voltage point of the line wave at time $t_3$, another 8.33 millisecond interval is counted to time $t_6$, and the polarity of the line wave is again detected. In this instance the line wave has changed polarity from positive to negative in the time period $t_3$ to $t_6$ thus indicating that the line wave half cycle is less than the desired 60 Hz half cycle. Again, the line wave is not dissipated. At time $t_5$ when the line voltage changes polarity another 8.33 millisecond time period is counted to time $t_7$, and the polarity of the line voltage remains negative thus indicating that this half-cycle of the line voltage is greater than the desired half-cycle. The excess line voltage is indicated by the curve 12 between the time period $t_7$ and the time period $t_8$ when the line voltage again changes polarity.

Referring now to FIG. 2 a block diagram illustrates a generator 20 connected to a power system transmission line 22 through a damping circuit 24. It is assumed that the power system transmission line carries voltage at 60 Hz, and the generator is generating a 60 Hz voltage with a spurious oscillation generating a subsynchronous frequency component, $\Delta$ Hz.

FIG. 3 is an electrical schematic of one embodiment of a current base apparatus for dissipating excess current and thus damping the subsynchronous oscillations. Capacitor 28 is serially connected in the transmission line 30 as typically employed to compensate for line inductance. Current dissipation circuit means is connected in parallel with capacitor 28 for dissipating the excess current and includes a resistor 32 serially connected with selectively bi-directional conduction means including thyristor 34 and thyristor 36. The thyristors are connected in parallel and in opposite polarity whereby current flow through resistor 32 can be selectively controlled in either direction. When high voltage is involved the thyristor will be replaced by an assembly of thyristors which together act as a thyristor. It will be appreciated that the thyristors may be replaced by other controllable conductive devices such as a triggered vacuum tube, an ignition, a power transistor switch, and like devices which can give controlled triggering in both directions. Thyristor 34 is triggered conductive by a control signal when the excessive line current half-cycle is positive, and thyristor 36 is triggered by a control signal when the excessive line current half-cycle is negative. In either case, after the larger half cycle is detected, the corresponding thyristor is fired to dissipate the excess current through resistor 32 for the excess portion of the line current half-cycle. This conduction causes capacitor 28 to discharge and accelerate the current zero of the line current. The loss of energy in the resistor thereby provides positive damping for the subsynchronous oscillation. Conduction through the thyristor ceases when the current polarity changes.

Figure 4:
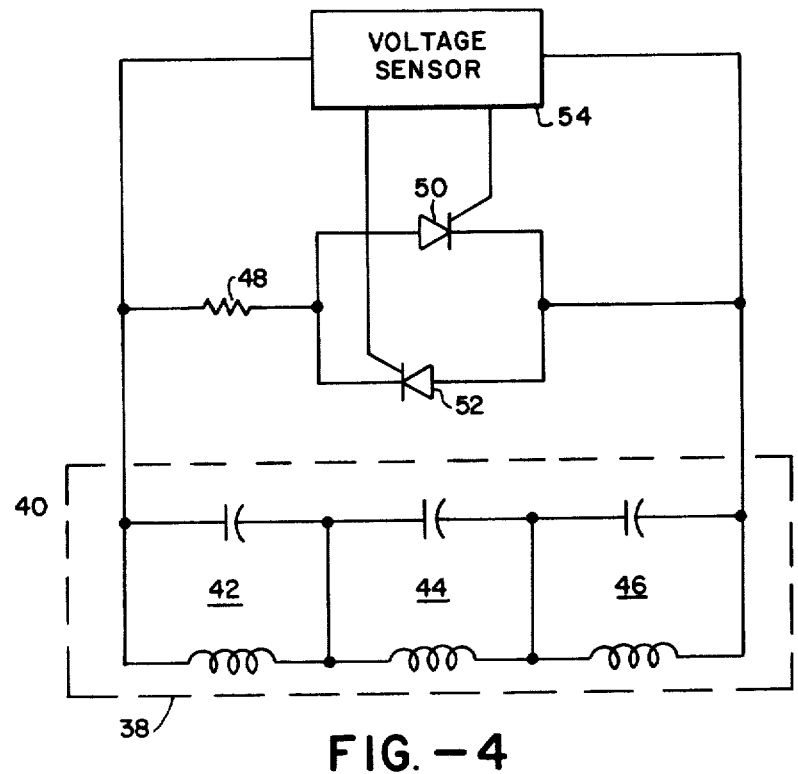
FIG. 4 is an electrical schematic of one embodiment of damping apparatus in accordance with the present invention.

Referring now to FIG. 4, an electrical schematic of one embodiment of damping apparatus in accordance with the present invention is illustrated. In this embodiment, the reactance means shown generally at 38 and serially connected in the transmission line 40 comprises a plurality of tuned circuits 42, 44, and 46, each of which may be tuned to a separate subsynchronous frequency in the power system. Thus, the impedance means 38 provides a voltage drop only for signals at the tuned subsynchronous frequency. Voltages at the system operating frequency (e.g., 60 Hz) are unimpeded by the reactance means 38.

The selectively bi-directional conduction means including resistor 48 and thyristors 50 and 52 is connected in parallel with the reactance means 38, and in accordance with the invention, the parallel connected thyristors 50, 52 are controlled by a voltage sensor 54 which is connected to sense the voltage across the reactance means 38. In response to an over voltage, the thyristors 50, 52 are fired, thereby dissipating the excess voltage across the reactance 38 and thereby preventing damage due to the over voltage condition. Voltage sensor 54 may comprise a simple resistor divider circuit whereby voltage above a pre-selected value determined by the resistor network will trigger the thyristors 50 and 52.

In accordance with another embodiment of the invention, the selectably bi-directional conduction means connected in parallel with capacitor 28 in FIG. 3 can be triggered not only by the positive control and negative control, as described, but also a voltage sensor such as the sensor 54 in FIG. 4. Thus, the selectably bi-directional conduction means responds to an over voltage to protect the capacitor from an over voltage, similar to the operation described with respect to FIG. 4, as well as selectively discharging the capacitor as in FIG. 3. For example, if the rated overload line current is 1,000 amps (rms), and the impedance of the capacitor at 60 hz is 10 ohms, then the peak voltage for the capacitor would be 14,140 volts. Allowing a 50% safety margin, the actual peak voltage for the capacitor would be 21.2 Kv. During disturbances, the current and therefore the capacitor voltage will rise and a thyristor will fire if the instantaneous voltage exceeds 21.2 Kv. Upon the firing of a thyristor, current flows through the resistor and the conductive thyristor and dissipates the capacitor voltage.

FIG. 5 is a block diagram of a suitable trigger circuit. Signal $V_{ct}$ proportional to the voltage $V_{ct}$ (FIG. 1) is rectified and each half-cycle is fed into identical circuitry for generating the control signals for the two switches 34 and 36, respectively (FIG. 3). The half wave is clamped and amplified in circuit 61 so that the output is a squarewave with step jump corresponding to the voltage zero of the input. This square wave is fed through the pulse generator 62, so that the output is a short pulse starting at the start of the square wave. This pulse is then fed through a delay circuit 63, which delays the pulse by a set time, such as 8.33 ms. This pulse is then sent through an AND gate 64 which lets the pulse through if the half wave input signal $V_{ct}$ is not zero. The pulse is then transmitted to the switch. The techniques of pulse transmission to a high voltage switch are well known. As above indicated the set time may be somewhat higher than 8.33 ms, such as 8.5 ms, for a 60 Hz system, or it may be somewhat lower than 8.33 ms. The set time itself could be controlled such that it can be increased if the thyristor conduction is to be delayed for certain conditions, or it can be decreased temporarily to increase the thyristor conduction time and therefore damping.

As above described, damping of subsynchronous oscillations and DC offset in an AC power system may be implemented in numerous embodiments in accordance with the present invention. In addition, during severe power disturbances some line voltage and current half waves may be much longer than the desired half-cycle in which case the thyristors may be stressed beyond their current ratings. In such cases, control logic can be incorporated in the trigger circuitry whereby the thyristor firing is delayed until the voltage and current drops below the thyristor maximum voltage and current rating. To accomplish this in FIG. 5 the AND gate 64 may be given an instantaneous voltage limit, so that the pulse is let through the AND gate if and when the half wave input signal $V_{ct}$ is less than a set value and not zero.

FIG. 9 is a block diagram of another suitable trigger circuit (shown only for one thyristor switch). It consists of a high frequency pulse generator 70, of sufficiently high frequency so that each pulse represents a small time period compared to the half-cycle period of the system. For example, for a pulse rate of 10 kHz, 83 pulses represent 8.3 ms. Pulses are allowed to pass through a gate 72 during positive half part of the waveform $V_{ct}$. The negative part of $V_{ct}$ is amplified by an amplifier/clamp 74 and used to block pulses through the gate during the negative parts of $V_{ct}$. Then a pulse counter 76 gives a pulse 78 after counting the number of pulses which represent the set half-cycle time period. This counter is reset to zero and stays continuously reset through the negative part of the wave $V_{ct}$. A similar circuit with corresponding wave input and polarity is provided for the other thyristor switch.

Accordingly, by utilizing the bi-directional conduction means and the described damping circuitry for overload protection and by utilizing tuned circuits as the serially connected impedance means in the system transmission lines, greater utility is realized with the damping circuitry. While the present invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. Apparatus for damping subsynchronous oscillations in an AC power line comprising
    reactance means serially connected in said power line,
    circuit means connected in parallel with said reactance means and including a resistor and a serially connected, selectably bi-directional conduction means,
    means for triggering said selectably bi-directional conduction means in response to half cycle time periods of current waves on said power lines exceeding a desired half-cycle time period, and
    means for triggering said selectably bi-directional conduction means in response to voltage across said reactance means exceeding a pre-selected value.

2. Apparatus as defined by claim 1 wherein said reactance means comprises at least one tuned circuit having a resonant frequency at a subsynchronous frequency.

3. Apparatus as defined by claim 2 wherein said reactance means comprises a plurality of serially connected, tuned circuits with each circuit having a resonant frequency at a subsynchronous frequency.

4. Apparatus for damping subsynchronous oscillations in an AC power line comprising:
    reactance means serially connected in said power line, said reactance means including at least one tuned circuit having a resonant frequency at a subsynchronous frequency,
    circuit means connected in parallel with said reactance means including a resistor and a serially connected, selectably bi-directional conduction means, and
    means for triggering said selectably bi-directional conduction means in response to half-cycle time periods of current waves on said power line exceeding a desired half-cycle time period.

5. Apparatus as defined by claim 4 wherein said reactance means comprises a plurality of serially connected tuned circuits with each circuit having a resonant frequency at a subsynchronous frequency.

6. Apparatus as defined by claim 1 wherein said reactance means comprises a capacitor.

* * * * *